April 28, 1942. W. V. THELANDER 2,280,870
FRICTION CLUTCH
Filed July 12, 1940
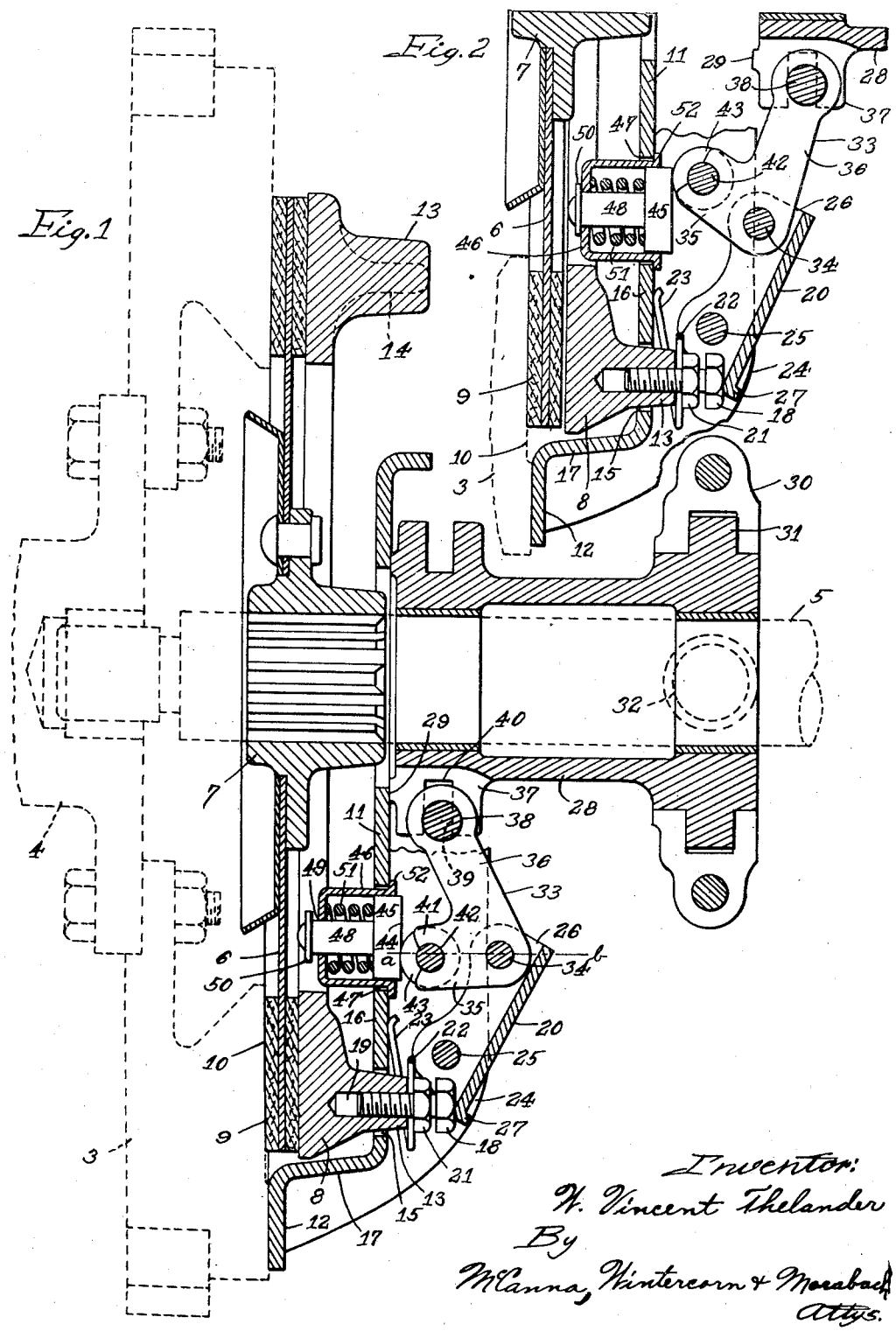
Inventor:
W. Vincent Thelander
By
McCanna, Wintercorn & Morsbach
Attys.

Patented Apr. 28, 1942

2,280,870

UNITED STATES PATENT OFFICE 2,280,870

FRICTION CLUTCH

W. Vincent Thelander, Rockford, Ill.

Application July 12, 1940, Serial No. 345,202

27 Claims. (Cl. 192—68)

This invention relates to friction clutches especially designed for use on tractors but suitable for use wherever an over-center type of clutch having the novel features of this invention may be needed, as, for example, in certain industrial applications.

One of the principal objects of my invention is to provide a clutch of the over-center type in which the clutch although arranged to be engaged under heavy spring pressure is operable with fairly light pedal pressure by virtue of unusually good mechanical advantage derived by the novel arrangement of over-center bell crank levers in connection with the release levers.

Another object of the invention consists in the novel arrangement of preloaded spring means relative to the over-center bell crank levers and release levers, so that in the engagement of the clutch the spring means is further loaded and is not only rendered effective in applying pressure to the pressure plate through the release levers, but also is effective in releasably locking the clutch throw-out sleeve by means of the over-center levers in the engaged position against accidental disengagement of the clutch.

A further object consists in the provision of a clutch which despite the over-center action, which in previous designs of clutches called for fine and necessarily frequent adjustments, will operate satisfactorily and without appreciable slippage for long periods without need for any attention, no fine adjustments being involved.

The invention is illustrated in the accompanying drawing, in which—

Figure 1 is a cross-section through a clutch made in accordance with my invention, the flywheel and the driving and driven shafts being shown in dotted lines, and Fig. 2 is a sectional view corresponding to a portion of Fig. 1, but showing the clutch disengaged.

The same reference numerals are applied to corresponding parts in these two views.

The reference numeral 3 is applied to a flywheel mounted on the rear end of an engine crank shaft 4 to form the driving element. A shaft 5 constituting the driven element extends rearwardly from the clutch into the gear box of the transmission in the usual way. The clutch disc 6 is carried on a hub 7 splined on the front end of the shaft 5, and a pressure plate 8 disposed behind and in concentric relation with the matted portion 9 of the disc is arranged to cause engagement thereof with the flat face 10 on the flywheel. 11 is a spider-shaped back plate which, in accordance with the disclosure in my copending application, Serial No. 236,607, filed October 24, 1938 and issued Sept. 17, 1940 as Patent No. 2,214,780, has a plurality of arms in equally circumferentially spaced relation, each provided with an attaching flange portion 12 by means of which the back plate or spider 11 is arranged to be bolted to the back of the flywheel 3. Also in accordance with the aforementioned application, there are lugs 13 projecting rearwardly from the pressure plate 8, parallel to the axis of rotation, having flat side faces 14 slidably engaging the opposite sides of slots 15 provided in the back plate to transmit drive through the back plate and pressure plate to the disc 6. As stated in said application, by having the lugs 13 parallel to the axis of rotation instead of projecting radially outwardly from the pressure plate, I have found that there is less distortion of the pressure plate, because the pressure application is within the area of the pressure plate and the clutch disc facings. Furthermore this arrangement makes for economy in production because there is less machining cost involved on the rearwardly projecting lugs than on radial lugs, and also less machining cost involved in slotting the back plate in the vertical wall 16 thereof as compared with slotting the peripheral wall 17. The lugs 13 in accordance with the earlier application also have set screws 18 threaded in longitudinal holes 19 provided therein, and when the heads of the screws 18 are properly adjusted with relation to the outer ends of release levers 20, lock nuts 21 are tightened against the rear ends of the lugs 13 to lock the screws in adjusted position. These lock nuts, as further disclosed in said earlier application, hold hairpin-shaped springs 22 in place on the rear ends of the lugs 13 with the legs 23 of the springs that are bent outwardly and forwardly into a plane at an acute angle with respect to the plane of the attaching portion of the spring bearing against the back plate 11 to provide a component parallel to the axis of rotation for causing the pressure plate 8 to back away from the flywheel and clutch disc when the clutch is released. The legs 23 of the springs 22 also have a lateral component resulting from the crowding of the legs against the flanges 24 provided on the back plate on opposite sides of each of the slots 15 in substantially parallel relation to one another. This lateral component of the springs keeps the lugs 13 centralized with respect to the slots 15 in the back plate when the clutch is released, thereby preventing or minimizing the danger of rattling. The springs 22 also serve a third purpose; in shipment of the clutch, they keep the pressure plate 8 in assembled relation to the back plate 11 so that there is a unitary assembly which is handy for shipment and facilitates assembling of the clutch on the engine flywheel, as is thought to be self-evident. The flanges 24 on the back plate carry cross-pins 25 on which the release levers 20, which are of channel-shaped cross-section, are pivoted by means of their flange portions 26. The outer end 27 of the web portion of each of the release levers bears against the head of a set screw 18 in the manner shown, so that pressure may be exerted through the levers 20 to cause engagement of the clutch. No novelty is claimed in the details of construction thus far described, the same corresponding to what was disclosed and claimed in the earlier application, excepting only in so far as these details go to make up other novel combinations as hereinafter described.

In accordance with my invention, the clutch throw-out sleeve 28 slidable to and fro on the shaft 5 and arranged in the engaged position of the clutch to have a flat front face 29 come into contact with the back plate 11, as shown in Fig. 1, has a throw-out collar 30 swiveled on its rear rim portion 31 for manually operating the sleeve in either direction, the collar having diametrically opposed trunnions 32 on which the usual throw-out fork moving with the clutch pedal, lever, or other clutch operating device has engagement. Each release lever 20 has an over-center bell crank lever 33 pivotally connected to the inner end thereof on a cross-pin 34 entered through holes in the flanges 26 of the release lever, the over-center lever being disposed between said flanges. Each over-center bell crank lever has a short arm 35 and a long arm 36 in acute angle relationship to one another, the arm 36 having its free end engaged in a bifurcated portion 37 on the front end of the throw-out sleeve 28 and being pivotally connected to said sleeve by a cross-pin 38, the opposite end portions of which are machined off on one side, as at 39, to fit in the annular groove 40 provided in the front end of the sleeve 28. With this connection, as the sleeve 28 is moved back and forth, the pin 38 will slide radially relative to the front end of the sleeve 28 in the groove 40 and the lever 36 will, of course, pivot with respect thereto. The short arm 35 of each over-center bell crank lever 33 is forked, as at 41, to provide a bearing for the axle portion 42 of an annularly grooved roller 43 arranged to turn with respect to the lever 33. Each of the rollers 43 rollingly engages the flat back face 44 of a spring pressed plunger 45 working in a sheet metal cup 46 set in a hole 47 provided therefor in the back plate 11. The plunger 45 has a stem 48 extending through a hole 49 in the inner end wall of the cup 46 and has a washer 50 riveted or otherwise suitably secured on the projecting end thereof so as to limit the outward movement of the plunger 45 under action of its preloaded coiled compression spring 51, as indicated in Fig. 2. The spring is housed in the cup 46 and surrounds the stem 48 between the inner end wall of the cup and the headed end of the plunger. An outwardly directed annular flange 52 on the rim of the cup 46 behind the back plate 11 supports the cup against inward movement relative to the back plate. The plunger 45 is so located relative to the release lever 20 and its pivotal connection 34 with the bell crank lever 33 that the lever 33 is disposed in the over-center position shown in Fig. 1 when the throw-out sleeve 28 comes into contact with the back plate 11 in the engagement of the clutch. The rollers 43 and the head ends of the spring pressed plungers 45 may be suitably hardened to resist wear, and it is obvious that with the anti-friction rolling action such as is obtained with the present construction the clutch will operate smoothly and easily and with minimum wear despite the fairly heavy spring loading of the clutch. The easy operation is also largely attributable to the unusually good leverage obtained with the novel arrangement of the two levers 20 and 33, which provides for the extent of movement of the throw-out sleeve 28 from the position of Fig. 2 to the position of Fig. 1 in the engagement of the clutch, thereby loading the preloaded springs 51 to the desired extent with the exertion of only light pedal or other pressure. A further advantage of the arrangement lies in the fact that although the throw-out sleeve has a wide range of movement, the operation of the clutch is accomplished with a very compact system of levers, enabling assembly within a comparatively small housing.

In operation, when the clutch is disengaged, the springs 22 hold the pressure plate 8 in retracted position relative to the clutch disc 6, as shown in Fig. 2, and the levers 20 and 33 are disposed as shown with the throw-out sleeve 28 fully retracted relative to the back plate 11. The spring pressed plungers 45 have their springs 51 under these conditions caged within the cups 46 under a predetermined preload pressure and, of course, the plungers are ineffective in so far as transmitting any spring pressure to the system of levers 20 and 33 is concerned. However, it will be noticed that the set screws 18 have their head ends held in abutment with the outer ends 27 of the release levers 20 under the conditions stated so that the moment the throw-out sleeve 28 is moved forwardly toward engagement of the clutch, the levers 33, turning on their pivots 34 in a counterclockwise direction, cause the levers 20 to turn on their pivots 25 in a clockwise direction by reason of the engagement of the rollers 43 with the spring pressed plungers 45 which will not yield in the initial movement of the levers 33 and 20, the spring pressure afforded by the springs 51 being many times greater than that afforded by the hairpin springs 22. As a result, the clearance between the pressure plate 8 and the clutch disc 6 is taken up in the initial forward movement of the throw-out sleeve 28 and then after the pressure plate and clutch disc 6 are "packed" against the back of the flywheel 3, pressure is applied by compression of the springs 51 as the short arms 35 of the over-center bell crank levers 33 move in a counter-clockwise direction about their pivots 34 toward a dead center position relative to the plungers 45. The springs 51 are thereby further compressed, as indicated in Fig. 1, and heavy spring pressure thus obtained is transmitted through the levers 20 to the pressure plate 8 so as to hold the clutch engaged firmly enough to prevent slippage even in the event of an average overload on the engine. The heavy spring pressure is obviously much more desirable than ordinary posisive engagement as obtained in so many other over-center clutches now available, because for one thing the fine and frequent adjustments required with the other constructions are made unnecessary with this construction, and it must be apparent that satisfactory engagement and freedom from slippage is assured for long periods of service with the present construction by reason of the resilient engagement, whereas with the other constructions there is no such assurance without frequent fine adjustments. The slight extent to which the levers 33 are moved past dead center at the time of engagement of the clutch, as illustrated by the dead center line a—b in Fig. 1, is not enough to reduce appreciably the spring pressure available for holding the clutch engaged but is ample to lock the clutch releasably in the engaged condition, the throw-out sleeve 28 being held resiliently in engagement with the back plate 11 under these conditions, as shown. There is, therefore, no danger of accidental disengagement of the clutch.

It is believed the foregoing description conveys a good understanding of the objects and advantages of my invention. The appended claims have been drawn to cover all legitimate modifications and adaptations.

I claim:

1. In a clutch comprising a driving element and a driven element, a pressure plate for holding the driving and driven elements frictionally engaged, a lever support, a lever pivoted intermediate its ends thereon arranged to communicate movement from its one end to the pressure plate to cause engagement of the clutch, compressible spring means on the lever support for applying clutch engaging pressure through said lever, and over-center means pivotally connected with the other end of said lever and arranged when moved to a substantially dead-center position between its pivotal connection with the lever and said spring means to compress said spring means and transmit pressure therefrom to said lever whereby to cause engagement of the clutch under spring pressure.

2. In a clutch comprising a driving element and a driven element, a pressure plate for holding the driving and driven elements frictionally engaged, a back plate providing a lever support, a lever pivoted on the back plate arranged to communicate movement to the pressure plate to cause engagement of the clutch, spring means carried on the back plate and adapted to apply clutch engaging pressure to the pressure plate through said lever, and over-center means acting between the lever and said spring means so that in its movement to and past dead-center the pressure of said spring means is transmitted to said lever to apply clutch engaging pressure to the pressure plate.

3. A clutch as set forth in claim 2, wherein the pressure plate has a projection extending rearwardly through an opening provided therefor in the back plate toward the lever for operation of the pressure plate by the lever and to provide a driving connection between the pressure plate and said back plate, said lever being disposed in operative relation to said projection, and a spring carried on and projecting laterally and forwardly from said projection and acting against the back plate to retract the pressure plate.

4. A clutch as set forth in claim 2, wherein the pressure plate has a projection extending rearwardly through an opening provided therefor in the back plate toward the lever for operation of the pressure plate by the lever and to provide a driving connection between the pressure plate and said back plate, said lever being disposed in operative relation to said projection, a spring carried on and projecting laterally and forwardly from said projection and acting against the back plate to retract the pressure plate, and a screw threadedly adjustable on said projection toward and away from the lever to change the operative relationship between the lever and pressure plate, said screw providing a support for the last-mentioned spring.

5. A clutch as set forth in claim 2, wherein the pressure plate has a projection extending rearwardly through an opening provided therefor in the back plate toward the lever for operation of the pressure plate by the lever and to provide a driving connection between the pressure plate and said back plate, said lever being disposed in operative relation to said projection, a spring carried on and projecting laterally and forwardly from said projection and acting against the back plate to retract the pressure plate, a screw threadedly adjustable on said projection toward and away from the lever to change the operative relationship between the lever and pressure plate, said screw providing a support for the last-mentioned spring, and a lock nut threaded on the screw and arranged to be tightened toward the projection and serving to clamp a portion of the spring in operative position on the projection.

6. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, hairpin springs carried on said drive lugs by their bight portions and having the legs thereof spread laterally and forwardly into engagement with the walls on the lever supporting means to retract the pressure plate relative to the flywheel, a bell-crank lever pivotally connected to the inner end of said release lever and having one arm swingable toward a clutch engaging position crowded between the inner end of said release lever and the lever supporting means so as to transmit clutch engaging pressure to the pressure plate through said release lever, and clutch operating means operatively associated with the other arm of said bell-crank lever.

7. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, a release lever pivotally supported near its outer end on the lever supporting means adjacent each of said lugs with the outer end disposed in operative relation to the lug to transmit pressure to the pressure plate, a bell-crank lever pivotally connected to the inner end of said release lever and having one arm swingable toward a clutch engaging position crowded between the inner end of said release lever and the lever supporting means so as to transmit clutch engaging pressure to the pressure plate through said release lever, and clutch operating means operatively associated with the other arm of said bell-crank lever.

3. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, a bell-crank lever pivotally connected to the inner end of said release lever and having one arm swingable to and from a clutch engaging position substantially normal to the lever supporting means, a spring-pressed plunger carried on the lever supporting means and engageable by said arm to transmit spring pressure through the arm to the release lever to engage the clutch under spring pressure, and clutch operating means operatively associated with the other arm of said bell-crank lever.

9. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, retracting spring means mounted on said lugs and engaging the back plate tending normally to disengage the clutch, other spring means arranged to act between the back plate and the inner ends of said levers to cause engagement of the clutch, and over-center bell-crank levers pivotally connected to the inner ends of said release levers and each having one arm arranged in the movement of the bell-crank levers toward dead-center position to transmit the pressure of the last-mentioned spring means to the inner ends of said release levers, the other arms of said over-center bell-crank levers being operable manually to apply and release the spring pressure from the pressure plate.

10. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, spring means arranged to act between the back plate and the inner ends of said levers to cause engagement of the clutch, and over-center bell-crank levers pivotally connected to the inner ends of said release levers and each having one arm arranged in the movement of the bell-crank levers toward dead-center position to transmit the pressure of said spring means to the inner ends of said release levers, the other arms of said over-center bell-crank levers being operable manually to apply and release the spring pressure from the pressure plate.

11. In a friction clutch comprising a flywheel serving as a driving element and a clutch disk serving as a driven element and mounted on a driven shaft, a pressure plate for holding the clutch disk frictionally engaged with the flywheel, said plate having a plurality of circumferentially spaced drive lugs projecting therefrom, a back plate mounted on the flywheel and having openings provided therein in which the drive lugs are slidably engaged whereby to transmit drive from the flywheel to the pressure plate, release levers pivotally supported near their outer ends on said back plate with their outer ends disposed for operative engagement with said lugs to transmit pressure to the pressure plate, a clutch throw-out sleeve slidable on the driven shaft toward and away from engagement with the back plate, and over-center bell-crank levers pivotally mounted intermediate their ends on the inner ends of said release levers and each having the free end of one arm thereof pivotally connected with the throw-out sleeve while the other arm projects toward the back plate and is movable to a position crowded between the back plate and the inner end of the associated release lever.

12. A friction clutch as set forth in claim 11, including resilient means on the back plate engaging the free end of the last-mentioned arm of each of said bell-crank levers to transmit spring pressure to the release levers to cause engagement of the clutch while at the same time holding the throw-out sleeve in spring-pressed engagement with the back plate with the bell-crank levers locked releasably in over-center position.

13. A friction clutch as set forth in claim 11, including preloaded compression spring means on the back plate arranged to be engaged and further compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position.

14. A friction clutch as set forth in claim 11, including preloaded compression spring means on the back plate arranged to be engaged and further compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position, said means including plungers to engage and transmit spring pressure to the bell-crank lever arms.

15. A friction clutch as set forth in claim 11, including preloaded compression spring means on the back plate arranged to be engaged and further compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position, said means including plungers to engage and transmit spring pressure to the bell-crank lever arms, and said bell-crank levers having rollers on the arms thereof rollingly engaging said plungers for anti-friction operation.

16. A friction clutch as set forth in claim 11, including compression spring means on the back plate arranged to be engaged and compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position.

17. A friction clutch as set forth in claim 11, including compression spring means on the back plate arranged to be engaged and compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position, said means including plungers to engage and transmit spring pressure to the bell-crank lever arms.

18. A friction clutch as set forth in claim 11, including compression spring means on the back plate arranged to be engaged and compressed by the free end of the last-mentioned arms of the bell-crank levers in the clutch engaging movement thereof, said means acting to transmit spring pressure to the release levers to hold the clutch engaged while at the same time holding the throw-out sleeve in spring-pressed engagement with the back plate with the bell-crank levers locked releasably in over-center position, said means including plungers to engage and transmit spring pressure to the bell-crank lever arms, and said bell-crank levers having rollers on the arms thereof rollingly engaging said plungers for anti-friction operation.

19. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers of channel-shaped cross-section pivotally supported by their flanges near their outer ends on said back plate with the outer ends disposed in operative relation to the rear ends of said lugs to transmit pressure from the web portions of said levers at their outer ends to the pressure plate, and bell-crank levers pivotally supported intermediate their ends between the flanges of said release levers at the inner ends of the latter, each of the bell-crank levers having one arm projecting toward the back plate and movable to a position crowded between the back plate and the inner end of the associated release lever to cause engagement of the clutch, the other arm of each of said bell-crank levers being operable manually to cause engagement and disengagement of the clutch.

20. Actuating mechanism for a pair of clutch elements forming the gripping portions of a friction clutch, comprising a release lever pivotally mounted intermediate its ends on one of the clutch elements and abutting at one of its ends the other of said clutch elements, and manually operable lever means supported for pivotal movement on the other end of said release lever and having a portion movable to a position crowded between the latter end of said release lever and the first-mentioned clutch element so as to clamp the elements together when said lever means is moved to substantially dead-center position.

21. Actuating mechanism for a pair of clutch elements forming the gripping portions of an over-center clutch, comprising a release lever pivotally mounted intermediate its ends on one of the clutch elements and abutting at one of its ends the other of said clutch elements, resilient means also carried on said clutch element in spaced relation to the other end of the release lever, and over-center lever means supported for pivotal movement on the latter end of said release lever and having a portion swingable toward a clutch engaging position crowded between the latter end of said release lever and said resilient means so as to deflect the latter and transmit pressure therefrom to said release lever to clamp the clutch elements together resiliently when said lever means is moved over center.

22. Clutch actuating mechanism as set forth in claim 21, wherein said resilient means comprises preloaded spring means arranged to be loaded further in the movement of said lever means over center, whereby to cause engagement of the clutch under increased spring pressure.

23. Clutch actuating mechanism as set forth in claim 21, including an abutment for a throw-out collar in rigid relation with the clutch element that supports the release lever, and a manually reciprocable throw-out collar operatively connected with another portion of the over-center lever means and arranged in the engagement of the clutch to engage said abutment so as to limit the movement of said lever means past center, said throw-out collar being held resiliently engaged with said abutment under pressure of the resilient means transmitted to the throw-out collar through the over-center lever means.

24. Clutch actuating mechanism as set forth in claim 21, including an abutment for a throw-out collar in rigid relation with the clutch element that supports the release lever, and a manually reciprocable throw-out collar operatively connected with another portion of the over-center lever means and arranged in the engagement of the clutch to engage said abutment so as to limit the movement of said lever means past center, said throw-out collar being held resiliently engaged with said abutment under pressure of the resilient means transmitted to the throw-out collar through the over-center lever means, said resilient means comprising preloaded spring means arranged to be loaded further in the movement of said lever means over center, whereby to cause engagement of the clutch under increased spring pressure.

25. In a clutch comprising a driving element and a driven element, a pressure plate for holding the driving and driven elements frictionally engaged, a back plate providing a lever support, a lever pivoted near its outer end on the back plate and arranged to communicate movement from its outer end to the pressure plate to cause engagement of the clutch, spring means carried on the back plate and adapted to apply clutch engaging pressure to the pressure plate through said lever, and an L-shaped actuating lever having a short arm and a long arm and pivoted at the juncture of its arms on the inner end of the first lever so that the short arm is arranged to move between the inner end of the first lever and said spring means toward a substantially dead-center position to transmit the pressure of said spring means to said first lever to apply clutch engaging pressure to the pressure plate, said actuating lever being manually operable by means of its long arm.

26. A clutch as set forth in claim 25, wherein the spring means is preloaded and is arranged to be loaded further by said actuating lever in the engagement of the clutch, whereby to cause engagement of the clutch under increased spring pressure.

27. In a clutch comprising a driving element and a driven element, a pressure plate for holding the driving and driven elements frictionally engaged, a back plate providing a lever support, a lever pivoted near its outer end on the back plate and arranged to communicate movement from its outer end to the pressure plate to cause engagement of the clutch, and an L-shaped actuating lever having a short arm and a long arm and pivoted at the juncture of its arms on the inner end of the first lever so that the short arm is arranged to move between the inner end of the first lever and said back plate toward a substantially dead-center position to cause engagement of the clutch, said actuating lever being manually operable by means of its long arm.

W. VINCENT THELANDER.